US012645081B2

(12) United States Patent
Jeong et al.

(10) Patent No.: US 12,645,081 B2
(45) Date of Patent: Jun. 2, 2026

(54) LENS BASED ON HUMAN VISUAL SYSTEM, VIDEO SEE-THROUGH APPARATUS EMPLOYING THE LENS, AND METHOD OF DESIGNING THE LENS

(71) Applicant: SAMSUNG ELECTRONICS CO., LTD., Suwon-si (KR)

(72) Inventors: Youngmo Jeong, Suwon-si (KR); Jongchul Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 115 days.

(21) Appl. No.: 18/233,091

(22) Filed: Aug. 11, 2023

(65) Prior Publication Data

US 2024/0027768 A1 Jan. 25, 2024

Related U.S. Application Data

(63) Continuation of application No. PCT/KR2023/010570, filed on Jul. 21, 2023.

(30) Foreign Application Priority Data

Jul. 21, 2022 (KR) ........................ 10-2022-0090576
Oct. 31, 2022 (KR) ........................ 10-2022-0143021

(51) Int. Cl.
*G02B 27/00* (2006.01)
*G02B 27/01* (2006.01)
(52) U.S. Cl.
CPC ................................ *G02B 27/0172* (2013.01)

(58) Field of Classification Search
CPC ........ G02B 27/0172; G02B 3/00; G02B 3/02; G02B 27/01; G02B 27/0101;
(Continued)

(56) References Cited

U.S. PATENT DOCUMENTS 5,905,561 A 5/1999 Lee et al.
10,330,933 B2 6/2019 Jang et al.
(Continued)

FOREIGN PATENT DOCUMENTS

JP 2011-215185 A 10/2011
JP 2014-102394 A 6/2014
(Continued)

OTHER PUBLICATIONS

Piotr Napieralski et al., "Modeling Human Pupil Dilation to Decouple the Pupillary Light Reflex", Open Phys., De Gruyter, 2019, vol. 17, pp. 458-467.
(Continued)

*Primary Examiner* — Henry Duong
(74) *Attorney, Agent, or Firm* — Sughrue Mion, PLLC

(57) ABSTRACT

A lens includes at least one lens element configured to interface with a user's pupil along an optical-axis direction from a side of the user's pupil to a side of a display surface. The at least one lens element defines an aperture stop that is configured to be at least a portion of an area for facing the user's pupil. The aperture stop defines a plurality of sub-stop areas corresponding to a plurality of gaze directions within an entire viewing angle of the user with respect to the optical-axis direction. An orientation of the plurality of sub-stop areas are based on a human visual system.

21 Claims, 14 Drawing Sheets

(58) Field of Classification Search

CPC ............ G02B 27/0103; G02B 27/0149; G02B 27/017; G02B 27/0176; G02B 27/0179; G02B 27/0189; G02B 2027/0105; G02B 2027/0107; G02B 2027/0109; G02B 2027/011; G02B 2027/0112; G02B 2027/0114; G02B 2027/0116; G02B 2027/0118; G02B 2027/012; G02B 2027/0123; G02B 2027/0121; G02B 2027/0125; G02B 2027/0127; G02B 2027/0129; G02B 2027/013; G02B 2027/0132; G02B 2027/0134; G02B 2027/0136; G02B 2027/0138; G02B 2027/014; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0178; G02B 2027/0181; G02B 2027/0183; G02B 2027/0185; G02B 2027/0187; G02B 2027/019; G02B 2027/0194; G02B 2027/0192; G02B 2027/0196; G02B 2027/0198

USPC ........................................................ 359/630

See application file for complete search history.

(56) References Cited

U.S. PATENT DOCUMENTS

| | | | |
|---|---|---|---|
| 10,432,920 | B2 | 10/2019 | Benitez et al. |
| 10,502,959 | B2 | 12/2019 | Stafford et al. |
| 10,609,364 | B2 | 3/2020 | Geng et al. |
| 10,690,813 | B2 | 6/2020 | Benitez et al. |
| 10,830,938 | B2 | 11/2020 | Eisenfeld |
| 11,080,874 | B1 | 8/2021 | Bardagjy |
| 11,143,865 | B1 | 10/2021 | Bedard et al. |
| 11,609,427 | B2 | 3/2023 | El-Ghoroury et al. |
| 2008/0049152 | A1 | 2/2008 | Hong et al. |
| 2014/0139899 | A1* | 5/2014 | Hotta ...................... G02B 5/20 |
| | | | 359/227 |
| 2015/0002940 | A1 | 1/2015 | Nister et al. |
| 2023/0204947 | A1* | 6/2023 | Konno ................... G03B 13/02 |
| | | | 359/613 |
| 2024/0069328 | A1* | 2/2024 | Jin ....................... G02B 25/001 |

FOREIGN PATENT DOCUMENTS

| | | |
|---|---|---|
| JP | 2022-046404 A | 3/2022 |
| KR | 10-2018-0036865 A | 4/2018 |
| WO | 2021/016761 A1 | 2/2021 |

OTHER PUBLICATIONS

G. W. Forbes, "Shape specification for axially symmetric optical surfaces", Optics Express, vol. 15, No. 8, Apr. 16, 2007, pp. 5218-5226.

International Search Report (PCT/ISA/210) and Written Opinion (PCT/ISA/237) issued by the International Searching Authority on Oct. 26, 2023 in corresponding International Application No. PCT/KR2023/010570.

Hekun Huang et al., "An integral-imaging-based head-mounted light field display using a tunable lens and aperture array", Journal of the Society for Information—SID, 25(3), Mar. 1, 2017, 8 pages, DOI:10.1002/jsid.548.

Extended European Search Report issued Jul. 22, 2025 by the European Patent Office for EP Patent Application No. 23843429.4.

* cited by examiner

Spatial Frequency (cycles/mm)

Modulation

LENS BASED ON HUMAN VISUAL SYSTEM, VIDEO SEE-THROUGH APPARATUS EMPLOYING THE LENS, AND METHOD OF DESIGNING THE LENS

CROSS-REFERENCE TO RELATED APPLICATIONS

This application is a continuation application of International Application No. PCT/KR2023/010570 designating the United States, filed on Jul. 21, 2023, in the Korean Intellectual Property Receiving Office, which claims priority from Korean Patent Application No. 10-2022-0090576, filed on Jul. 21, 2022, in the Korean Intellectual Property Office and from Korean Patent Application No. 10-2022-0143021, filed on Oct. 31, 2022, in the Korean Intellectual Property Office, the disclosures of which are hereby incorporated by reference herein in their entireties.

TECHNICAL FIELD

The disclosed embodiments relate to a lens, a video see-through apparatus employing the lens, and a method of designing the lens, and more particularly, to a lens according to the human visual system, a video see-through apparatus employing the lens, and a method of designing the lens.

BACKGROUND

Interest in video see-through (VST) apparatuses has increased. A video see-through method allows enjoying virtual reality (VR) or augmented reality (AR) by wearing a head-mounted display (HMD) with a camera attached thereto.

A video see-through apparatus is desired to be lightweight and compact, and an optical system employed in the video see-through apparatus is desired to have a wide viewing angle and transmit a high-quality image. The optical system includes a lens including one or more lens elements arranged in an optical-axis direction from the side of a user's pupil to the side of a display surface. Lenses have been designed to have the maximum performance for the maximum viewing angle at a fixed viewpoint, and the performance thereof has been improved by adding optical elements, sharing the characteristics of light, or using new structures.

SUMMARY

Provided are a lens capable of providing a wide viewing angle and transmitting a high-quality image, a video see-through apparatus employing the lens, and a method of designing the lens.

Provided are a lens according to a movement of a human gaze, a video see-through apparatus employing the lens, and a method of designing the lens.

Technical objects to be achieved by the disclosed embodiments are not limited to the above technical objects and there may be other technical objects.

A lens may include at least one lens element configured to interface with a user's pupil along an optical-axis direction from a side of the user's pupil to a side of a display surface. The at least one lens element may define an aperture stop that is configured to be at least a portion of an area for facing the user's pupil. The aperture stop may define a plurality of sub-stop areas corresponding to a plurality of gaze directions within an entire viewing angle of the user with respect to the optical-axis direction. An orientation of the plurality of sub-stop areas may be based on a human visual system.

A radial width of each sub-stop area with respect to the optical-axis direction may be based on a human pupil size.

Each of the plurality of sub-stop areas may be rotationally symmetrical about an optical axis in the optical-axis direction.

The plurality of sub-stop areas may be separated from each other or at least partially overlap each other.

A sub-field range may be allocated according to each sub-stop area.

The sub-field range may be based on a change in visual acuity according to a human corneal eccentricity.

A central sub-stop area of the plurality of sub-stop areas may correspond to a front gaze direction to provide the entire viewing angle.

A size of an entire stop area of the stop surface may be based on a total rotation angle ($\alpha$) of a human eye.

A video see-through apparatus may include: an electronic display configured to display an image; and a lens including at least one lens element configured to interface with a user's pupil along an optical-axis direction from a side of the user's pupil to a side of a display surface. The at least one lens element may define an aperture stop that is configured to be at least a portion of an area for facing the user's pupil. The aperture stop may define a plurality of sub-stop areas corresponding to a plurality of gaze directions within an entire viewing angle of the user with respect to the optical-axis direction. An orientation of the plurality of sub-stop areas may be based on a human visual system. The lens may be configured to direct the image generated by the electronic display to a user's pupil.

A method of making a lens including at least one lens element configured to interface with a user's pupil along an optical-axis direction from a side of the user's pupil to a side of a display surface, may include: setting at least a portion of an area of the lens facing the user's pupil as an aperture stop; dividing the aperture stop into a plurality of sub-stop areas corresponding to a plurality of gaze directions within an entire viewing angle of the user with respect to the optical-axis direction; allocating a plurality of sub-field ranges to the plurality of sub-stop areas, respectively; and optimizing each sub-stop area based on a corresponding gaze direction.

A radial width of each of the plurality of sub-stop areas with respect to the optical-axis direction may be based on a human pupil size.

Each of the plurality of sub-stop areas may be rotationally symmetrical about an optical axis in the optical-axis direction.

The plurality of sub-stop areas may be separated from each other or at least partially overlap each other.

The sub-field range may be based on a change in visual acuity according to a human corneal eccentricity.

The sub-field range may be based on a human macula range.

The at least one lens element may include a first lens element, a second lens element, and a third lens element. The first lens element, the second lens element, and the third lens element may be oriented sequentially along the optical-axis direction.

At least one surface of each of the first lens element, the second lens element, and the third lens element may include a polarization-selective reflection layer.

The sub-field range may be nine degrees.

The at least one lens element may include a first lens element, a second lens element, and a third lens element. The first lens element, the second lens element, and the third lens element may be oriented sequentially along the optical-axis direction.

At least one surface of each of the first lens element, the second lens element, and the third lens element may include a polarization-selective reflection layer.

The lens, the video see-through apparatus employing the lens, and the method of designing the lens may provide a wide viewing angle and transmit a high-quality image.

The lens, the video see-through apparatus employing the lens, and the method of designing the lens may suppress the image quality of the screen from degrading due to the movement of the gaze.

DETAILED DESCRIPTION

Figure 1:
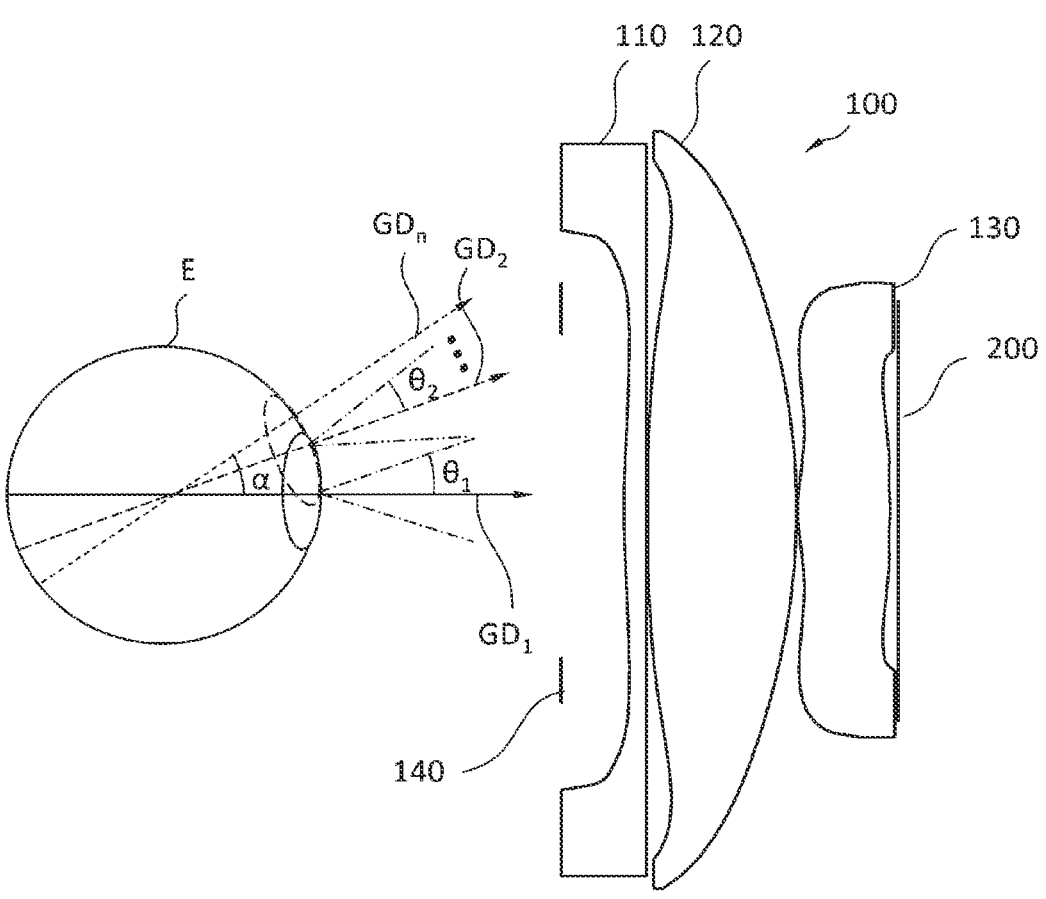
FIG. 1 schematically illustrates a video see-through apparatus according to an embodiment of the disclosure.

Hereinafter, embodiments will be described in detail with reference to the accompanying drawings so that those of ordinary skill in the art may easily implement the embodiments. However, the disclosed embodiments may be embodied in many different forms and should not be construed as being limited to the embodiments set forth herein. Also, portions irrelevant to the description will be omitted in the drawings for a clear description of the disclosed embodiments, and like reference numerals will denote like elements throughout the specification.

The terms used herein are those general terms currently widely used in the art in consideration of functions, but the terms may vary according to the intentions of those of ordinary skill in the art, precedents, or new technology in the art. Also, in some cases, there may be terms that are optionally selected by the applicant, and the meanings thereof will be described in detail in the corresponding portions of the disclosed embodiments. Thus, the terms used herein should be understood not as simple names but based on the meanings of the terms and the overall description of the disclosed embodiments.

As used herein, the singular forms "a", "an", and "the" are intended to include the plural forms as well, unless the context clearly indicates otherwise. When a part "includes" or "comprises" a component, unless there is a particular description contrary thereto, the part may further include other components, not excluding the other components.

As used herein, the term "lens" may refer to not only a single lens but also a lens including a plurality of lens elements. For clarity, each individual lens may also be referred to as a lens element.

Hereinafter, the disclosed embodiments will be described in detail with reference to the accompanying drawings.

Figure 2:
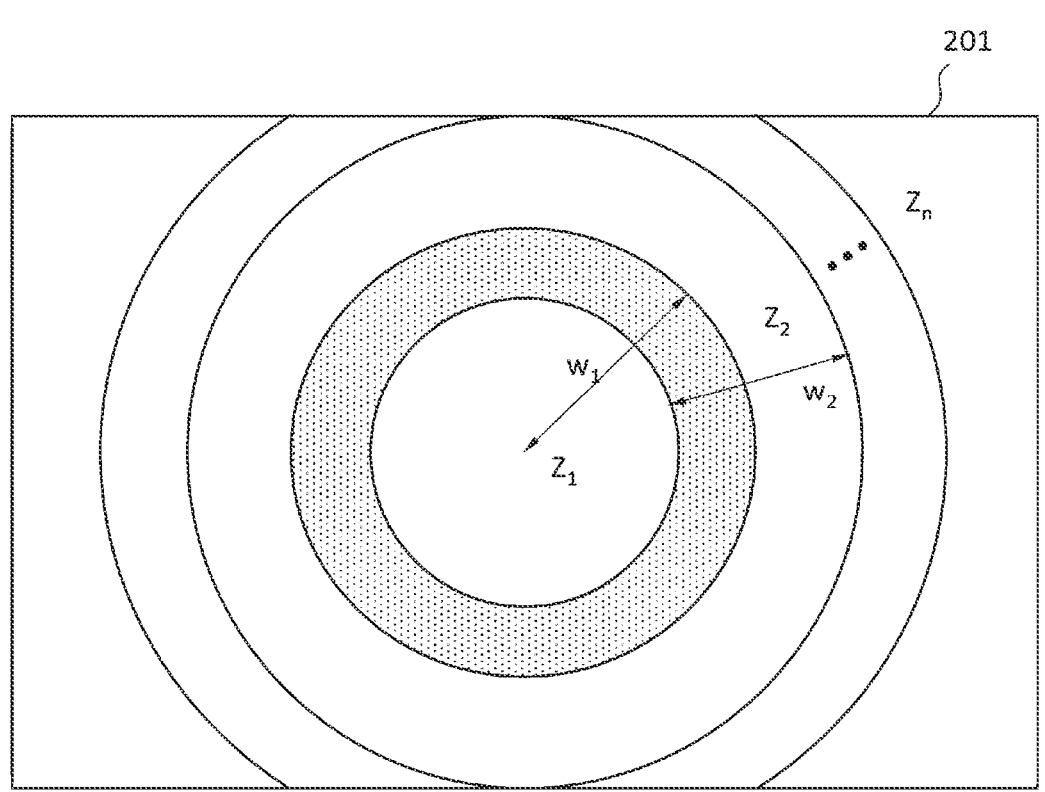
FIG. 2 illustrates an area on a display surface corresponding to a sub-stop area.

FIG. 1 schematically illustrates a video see-through apparatus according to an embodiment of the disclosure, and FIG. 2 illustrates an area on a display surface corresponding to a sub-stop area.

Referring to FIGS. 1 and 2, an electronic apparatus may include a lens 100 and an electronic display 200.

The electronic apparatus may be, for example, a video see-through apparatus configured to allow the user to see an image displayed on the electronic display 200 while wearing the same, such as a head-mounted display (HMD). The lens 100 may direct an image generated by the electronic display 200 to the user's pupil, and when the user wears the electronic apparatus, the lens 100 may be located adjacent to the user's pupil. In that the lens 100 is located adjacent to the user's pupil, the electronic apparatus may be understood as a near-eye display apparatus. Also, in that the user may wear the electronic apparatus, the electronic apparatus may be understood as a wearable device. Although not illustrated, the electronic apparatus may be configured to include a separate camera to photograph a real scene and provide the real scene to the user through the electronic display 200. The electronic apparatus may be a virtual reality device providing virtual reality or an augmented reality device providing augmented reality. Although the lens 100 and the electronic display 200 for one eyeball E are illustrated, the lens 100 and the electronic display 200 may be provided for each of the user's left and right eyes.

The lens 100 may include, for example, first to third lens elements 110, 120, and 130. A case where the lens 100 includes three lens elements (i.e., the first to third lens elements 110, 120, and 130) is described as an example; however, this is merely an example, and the lens 100 may include only one lens element or two lens elements or may include four or more lens elements.

The first to third lens elements 110, 120, and 130 may be sequentially arranged from the side of an object where the user is located to the side of a display surface 201 of the electronic display 200 where an image is formed (i.e., to an image side). The lens 100 may be a catadioptric lens; however, the disclosed embodiments are not limited thereto. For example, a second surface S3 (see FIG. 9) of the first lens 110, first and second surfaces S4 and S5 (see FIG. 9) of the second lens 120, and a second surface S7 (see FIG. 9) of the third lens 130 may have a polarization-selective reflection layer.

The lens 100 may further include an aperture stop 140. For example, the aperture stop 140 may be located at the front end (i.e., the object side) of the lens 100; however, the disclosed embodiments are not limited thereto. The aperture stop 140 may have a circular opening in consideration of the rotation of the eyeball E.

The electronic display 200 may be, for example, a liquid crystal panel, a micro light emitting diode (micro LED) panel, or an organic light emitting diode (OLED) panel; however, the disclosed embodiments are not limited thereto.

The lens 100 may have a stop surface that is at least a portion of an area facing the pupil of the user's eyeball E.

The size of an entire stop area may be determined based on a total rotation angle $\alpha$ of the human eyeball E. In other words, the user may not gaze only at the front while wearing the electronic apparatus and may change the gaze direction according to usage environments and provided images. Thus, the lens 100 may be designed to have a stop area corresponding to the total rotation angle $\alpha$ by which the user may rotate the eyeball E.

The stop surface may include a plurality of sub-stop areas $Z_1, Z_2, \ldots, Z_n$ divided according to a plurality of gaze directions $GD_1, GD_2, GD_n$ within an entire viewing angle. The number "n" of the plurality of sub-stop areas $Z_1, Z_2, \ldots, Z_n$ may be two or more. The plurality of sub-stop areas $Z_1, Z_2, \ldots, Z_n$ may be determined based on the human visual system. FIG. 2 illustrates an area corresponding to the plurality of sub-stop areas $Z_1, Z_2, \ldots, Z_n$ on the display surface 201 of the electronic display 200.

Because the human eyeball E may substantially rotate along the circumference around the front, each of the sub-stop areas $Z_1, Z_2, \ldots, Z_n$ may be rotationally symmetrical about an optical axis. In this case, the optical axis may be the same as the first gaze direction $GD_1$ when the user gazes at the front; however, the disclosed embodiments are not limited thereto. In this case, the width of each of the sub-stop areas $Z_1, Z_2, \ldots, Z_n$ may be understood as a width in a radial direction.

The plurality of sub-stop areas $Z_1, Z_2, \ldots, Z_n$ may be separated from each other or may at least partially overlap each other. In FIG. 2, a portion where the first sub-stop area $Z_1$ and the second sub-stop area $Z_2$ partially overlap each other is shaded.

The width of each of the sub-stop areas $Z_1, Z_2, \ldots, Z_n$ may be determined based on the human pupil size. The human pupil size may vary from person to person and may also vary depending on the surrounding brightness. For example, the electronic apparatus such as a virtual reality device may provide a brightness of about 150 nits to about 200 nits, and in this case, it is known that the human pupil size is about 3 mm to about 4 mm. Thus, the width of each sub-stop area may be determined based on a size of about 3 mm to about 4 mm. Because the brightness provided by the electronic apparatus may vary depending on the usage environment thereof, the performance of, for example, the electronic display 200, the width of each of the sub-stop areas $Z_1, Z_2, \ldots, Z_n$ is not limited to the above values.

As an example, all of the widths of the sub-stop areas $Z_1, Z_2, \ldots, Z_n$ may be equal to each other.

As an example, the widths of the sub-stop areas $Z_1, Z_2, \ldots, Z_n$ may be different from each other. For example, a width $w_1$ of the first sub-stop area $Z_1$ corresponding to the first gaze direction $GD_1$ in which the user gazes at the front may be different from a width $w_2$ of the second sub-stop area $Z_2$ corresponding to the second gaze direction $GD_2$ different from the first gaze direction $GD_1$.

Each of the sub-stop areas $Z_1, Z_2, \ldots, Z_n$ may have each sub-field range. The sub-field may be an angle range (i.e., a visual field) that is clearly visible in each of the gaze directions $GD_1, GD_2, \ldots, GD_n$ corresponding to each of the sub-stop areas $Z_1, Z_2, \ldots, Z_n$. The sub-field range may be determined by considering a change in visual acuity according to the human corneal eccentricity. With respect to each of the gaze directions $GD_1, GD_2, GD_n$, at least some of the sub-fields may have different ranges or all of the sub-fields may have the same range. For example, the sub-field may be an angle range of $\pm 9°$ corresponding to a macula range in each of the gaze directions $GD_1, GD_2, \ldots, GD_n$.

When a first sub-field is allocated $\theta_1$ with respect to a central sub-stop corresponding to the first gaze direction $GD_1$ at the front, that is, the first sub-stop area $Z_1$, a clearly visible viewing angle of the first sub-stop area $Z_1$ may be in the range of $\pm \theta_1$. Likewise, when a second sub-field is allocated $\theta_2$ with respect to the second sub-stop area $Z_2$ corresponding to the second gaze direction $GD_2$, a clearly visible viewing angle of the second sub-stop area $Z_2$ may be in the range of $\pm \theta_2$ with respect to the second gaze direction $GD_2$.

Moreover, even when the clearly visible viewing angle of the central sub-stop, that is, the first sub-stop area $Z_1$, is in the range of $\pm \theta_1$, the central sub-stop may provide the entire viewing angle.

Next, the characteristics of the lens 100 will be described in relation to the human visual system.

Figure 3:
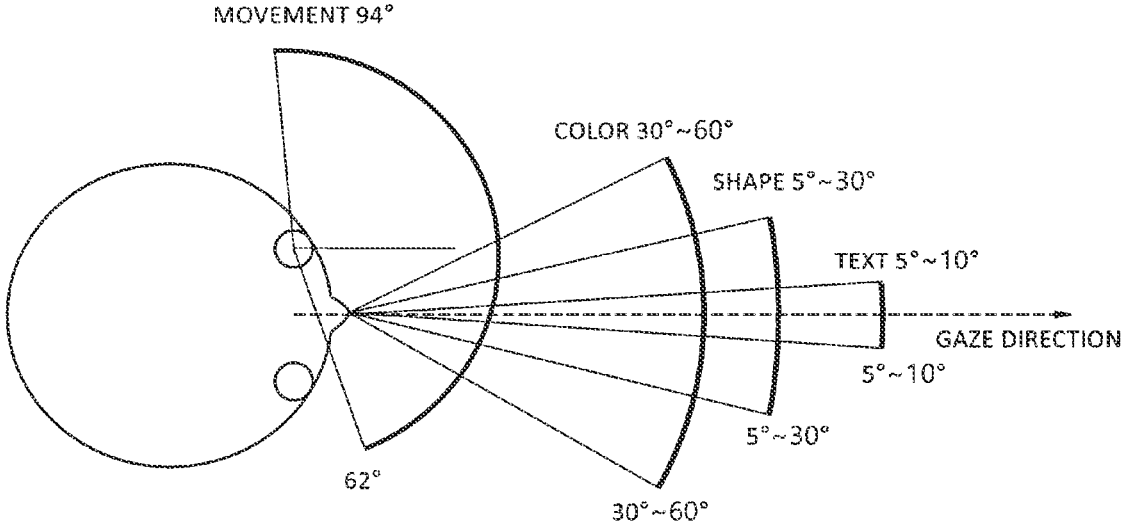
FIG. 3 is a diagram describing the human perceptible levels depending on viewing angles.
Figure 4:
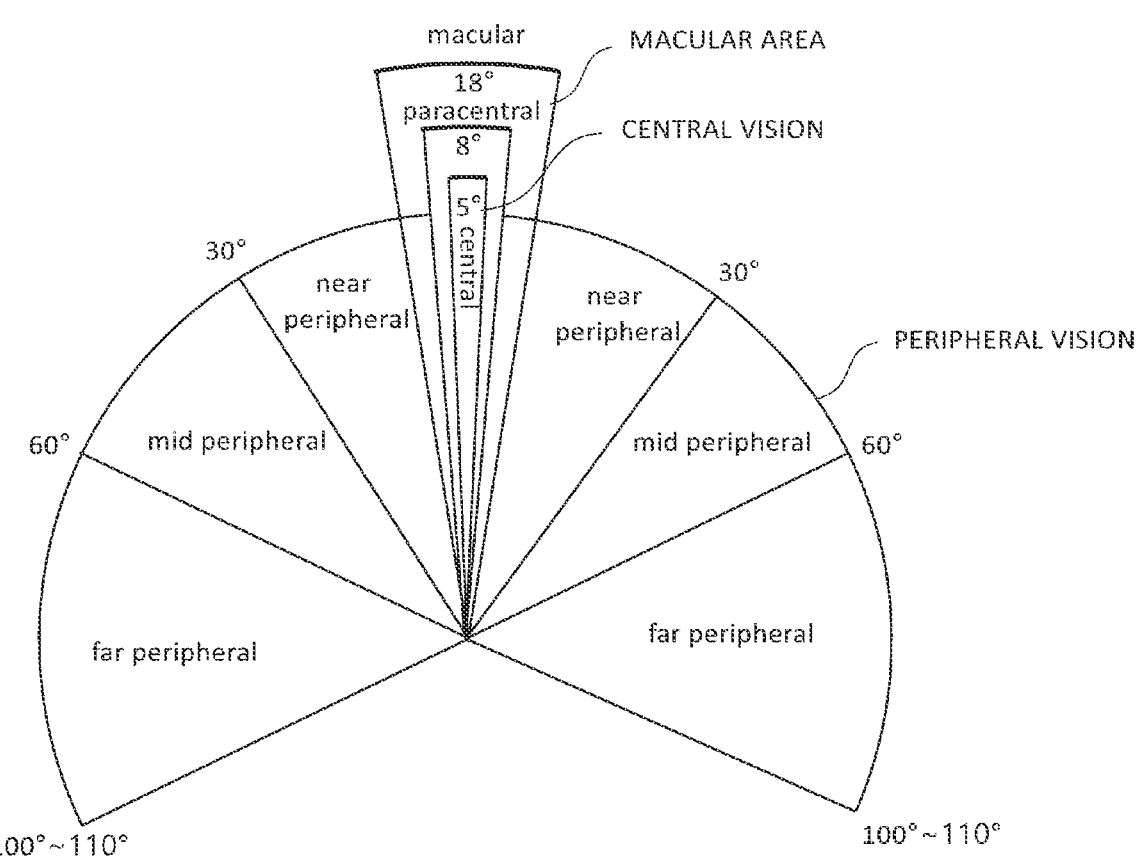
FIG. 4 is a diagram describing the classification of visual fields according to viewing angles (eccentricity).
Figure 5:
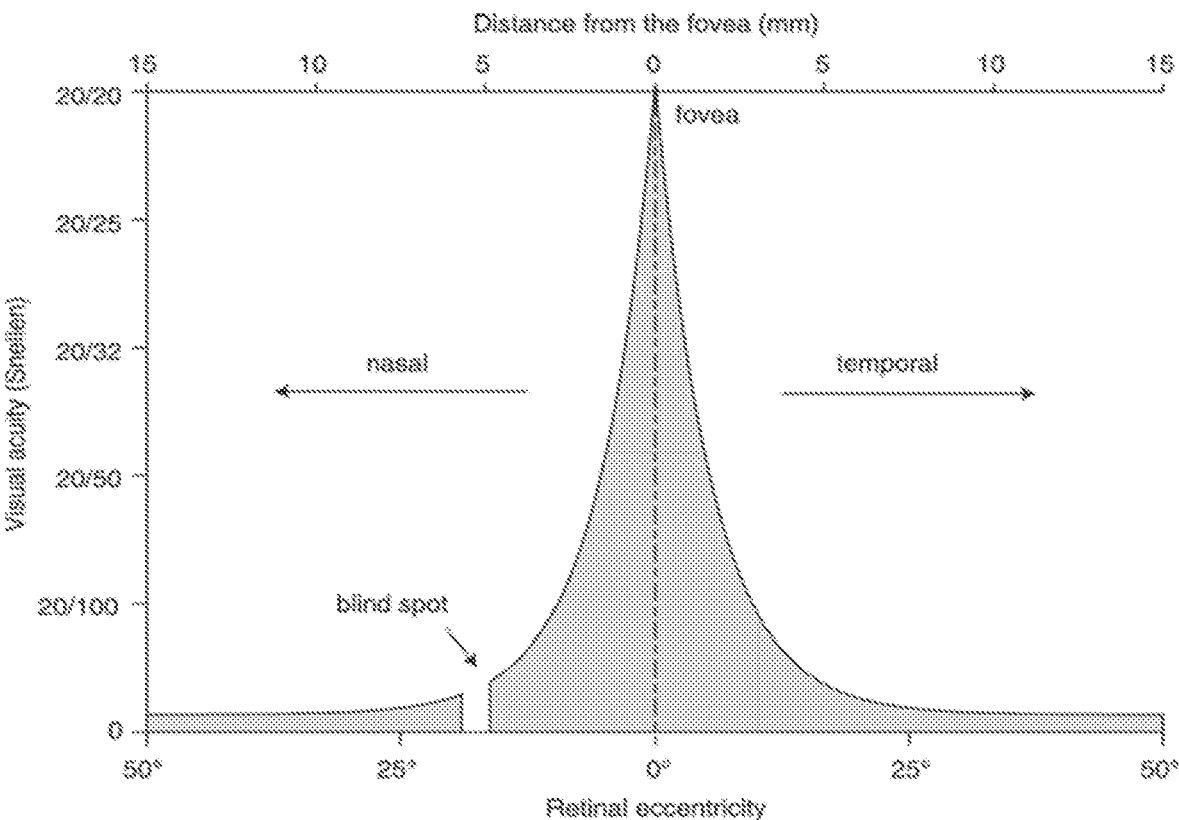
FIG. 5 is a diagram describing the human visual acuity depending on viewing angles.

FIG. 3 is a diagram describing the human perceptible levels depending on viewing angles, FIG. 4 is a diagram describing the classification of visual fields according to viewing angles (eccentricity), and FIG. 5 is a diagram describing the human visual acuity depending on viewing angles.

The human visual system applied to the lens 100 will be described with reference to FIGS. 3 to 5.

As illustrated in FIGS. 3 to 5, the human visual system may be a highly-foveated system. In other words, the human visual system may have a visual field where only a central portion is clearly visible and the other portions are barely visible. The maximum visual acuity may appear in a viewing angle period of about 3° to about 5°, only an approximate shape of the object may be detected at a viewing angle of up to about 30° to about 40°, only the color of the object may be detected at a viewing angle of up to 60°, and only the movement of the object may be detected in a subsequent period.

A general lens employed in a video see-through apparatus of the related art may be designed at a fixed viewpoint. The video see-through apparatus may require the lens to have a wide viewing angle for immersion, and the size of an entrance pupil (i.e., an eyebox) may decrease to optimize a steep incident light. The inventor found that the general lens designed at a fixed viewpoint failed to correspond to the rotation of the eyeball and the specifications of the central lens increased excessively for high image quality. Accordingly, the image quality of the screen may degrade greatly according to the movement of the user's gaze, and the screen may disappear according to the movement of the user's gaze due to a narrow eyebox.

The lens 100 may correspond to the rotation of the eyeball E, by trading off the image quality excessively wasted in the central portion, by designing the lens by considering the rotation of the eyeball E. That is, the lens 100 may correspond to the rotation of the eyeball E, by trading off the image quality excessively wasted in the central portion, by performing optimization only on a particular viewing angle range by using the fact that the human eye is foveated.

For example, when the user gazes at the front, a sub-field of $\pm 9°$ corresponding to the macula range may be allocated to the first sub-stop area $Z_1$ and optimization may be performed thereon. In this case, the size of the entrance pupil of the lens 100 corresponding to the first sub-stop area $Z_1$ may be approximately equal to or greater than the size of the user's pupil (e.g., about 3 mm to about 4 mm).

As described above, by designing the lens 100 by performing optimization on each of the plurality of sub-stop areas $Z_1, Z_2, \ldots, Z_n$ corresponding to the plurality of gaze directions $GD_1, GD_2, \ldots, GD_n$ even when the eyeball E is rotated to change the gaze direction, the lens 100 may transmit a high-resolution image from the electronic display 200 to the user's pupil, maintain a uniform resolution throughout the screen, and simultaneously provide a high sense of immersion. Also, even when the size of the entrance pupil in each of the sub-stop areas $Z_1, Z_2, \ldots, Z_n$ is about the size of the user's pupil, a practical eyebox provided by the lens 100 by corresponding to the rotation of the eyeball E The lens 100 may be sufficiently large and thus the lens 100 may provide a natural user experience by preventing the screen from being cut according to the gaze movement. Also, by using the fact that the peripheral resolution of the retina degrades, the lens 100 may provide a wide eyebox and high perceptual resolution.

Figure 6:
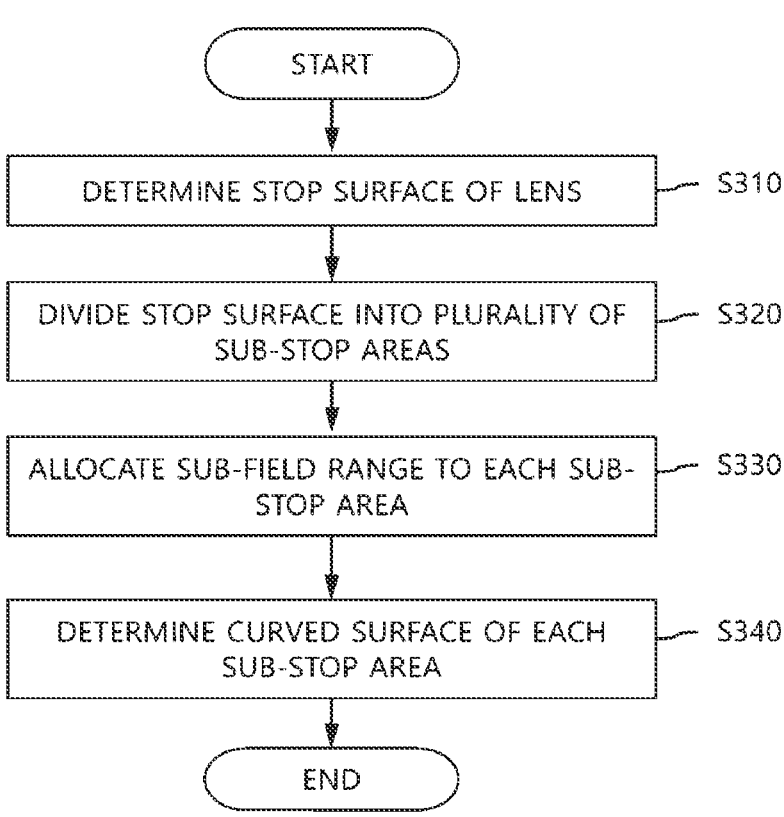
FIG. 6 is a flowchart of a method of designing a lens according to an embodiment of the disclosure.
Figure 7:
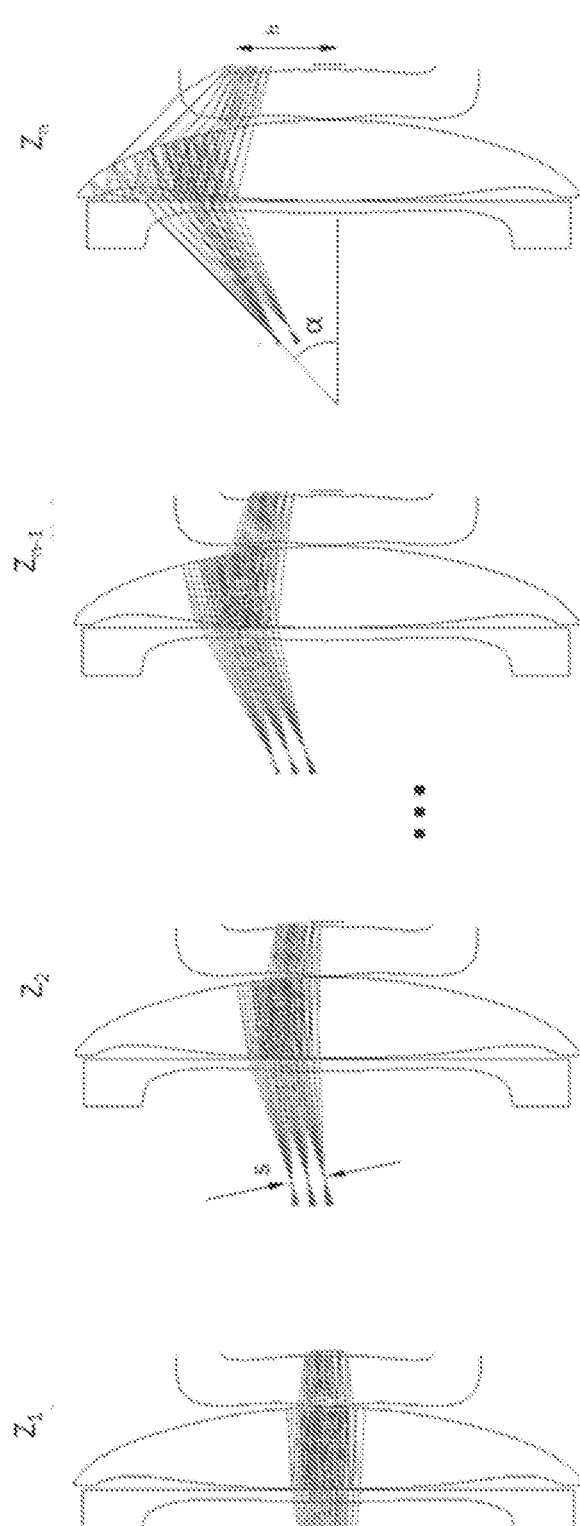
FIG. 7 illustrates ray diagrams in a plurality of sub-stop areas divided according to gaze directions.
Figure 8:
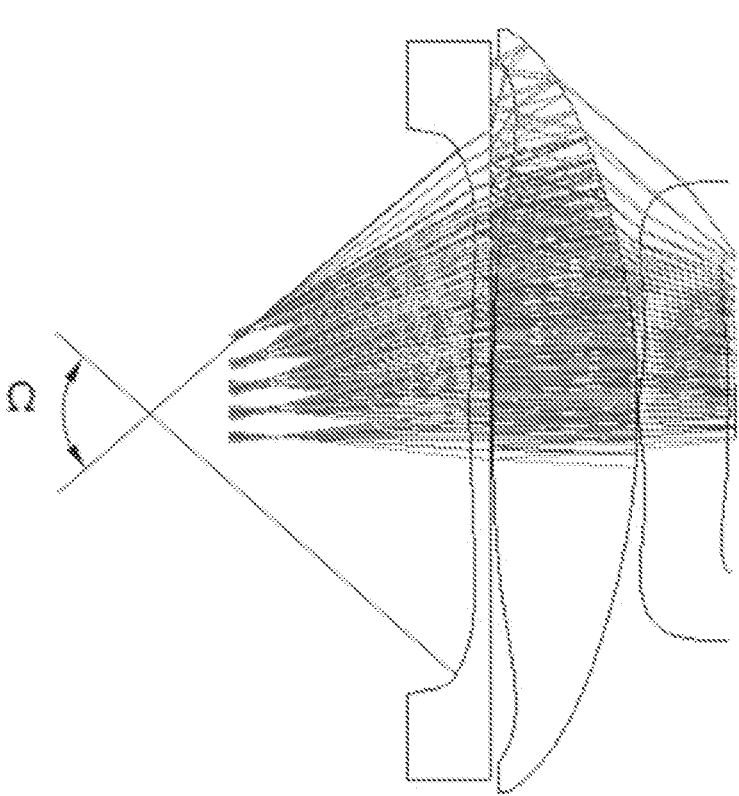
FIG. 8 illustrates a ray diagram corresponding to an overlap of all ray diagrams in a plurality of sub-stop areas divided according to gaze directions.

FIG. 6 is a flowchart describing a method of designing a lens according to an embodiment of the disclosure, FIG. 7 illustrates ray diagrams in a plurality of sub-stop areas divided according to gaze directions, and FIG. 8 illustrates a ray diagram corresponding to an overlap of all ray diagrams in a plurality of sub-stop areas divided according to gaze directions. In FIG. 7, "θ" denotes an angle range of a clearly visible sub-field, "s" denotes the size of an eyebox for a given gaze direction, "h" denotes the height of an image, that is, half of the diagonal length of the display surface 201, and in FIG. 8, "Ω" represents a total viewing angle provided by the lens 100.

Referring to FIGS. 6 to 8, the method may first determine at least a portion of an area of the lens facing the user's pupil as a stop surface (S310). The size of an entire stop area may be determined based on a total rotation angle α of the human eyeball E. The total rotation angle α of the human eyeball E may be determined by various methods of evaluating the degree to which the human may comfortably move the pupil, and may be asymmetrically defined according to the left/right of both eyes.

Next, the method may divide the stop surface into a plurality of sub-stop areas $Z_1, Z_2, \ldots, Z_n$ according to a plurality of gaze directions $GD_1, GD_2, \ldots, GD_n$ within an entire viewing angle (S320). The stop surface may be divided by several particular rotation angles representing the total rotation angle α. For example, in FIG. 7, the first sub-stop area $Z_1$ may correspond to a gaze direction at the front, that is, a first gaze direction $GD_1$ of 0°, the second sub-stop area $Z_2$ may correspond to a second gaze direction $GD_2$ of 10°, the (n−1)th sub-stop area $Z_{n-2}$ may correspond to an (n−1)th gaze direction $GD_{n-1}$ of 20°, and the n-th sub-stop area ($Z_n$) may correspond to an n-th gaze direction $GD_n$ of 30°.

Each of the sub-stop areas $Z_1, Z_2, \ldots, Z_n$ may be rotationally symmetrical about the optical axis. The plurality of sub-stop areas $Z_1, Z_2, \ldots, Z_n$ may be separated from each other or may partially overlap each other. The width of each of the sub-stop areas $Z_1, Z_2, \ldots, Z_n$ may be determined based on the human pupil size. The size "s" of the eyebox (i.e., the entrance pupil of the lens 100) for a given gaze direction may be about the size of the pupil of the eyeball E. For example, the size "s" of the eyebox for a given gaze direction may be determined to be slightly greater than the size of the pupil. For example, the size of the entrance pupil of the lens 100 may be approximately equal to or greater than the size of the user's pupil (e.g., about 3 mm to about 4 mm).

Next, the method may allocate a plurality of sub-field ranges 8 to the plurality of sub-stop areas $Z_1, Z_2, \ldots, Z_n$ respectively (S330). A sub-field for each of the sub-stop areas $Z_1, Z_2, \ldots, Z_n$ may be determined as a clearly visible area based on a change in visual acuity according to the human corneal eccentricity. An upper angle limit of a sub-field in which the lens clearly transmits an image at a fixed viewpoint position may be determined by considering a given form factor and resources. Also, a lower angle limit of the sub-field may be determined by considering a phenomenon such as a tunnel vision of the user. With respect to each of the gaze directions $GD_1, GD_2, \ldots, GD_n$ at least some of the sub-fields may have different ranges or all of the sub-fields may have the same range. For example, the sub-field range may be determined based on the human macula range. For example, a sub-field of ±9° corresponding to the average human macula range may be allocated.

Also, the central sub-stop corresponding to the front gaze direction may be designed to provide the entire viewing angle.

Next, the method may optimize the optical performance of each of the sub-stop areas $Z_1, Z_2, \ldots, Z_n$ based on the corresponding gaze direction (S340) and may design the entire stop surface by overlapping the sub-stop areas $Z_1, Z_2, \ldots, Z_n$ as illustrated in FIG. 8. In other words, the lens 100 may be optimized under the condition that the rotation angle of the eyeball E is set to be in different zoom states and the same lens is used.

Next, the lens 100 will be described with reference to FIG. 9 and a numerical example.

Figure 9:
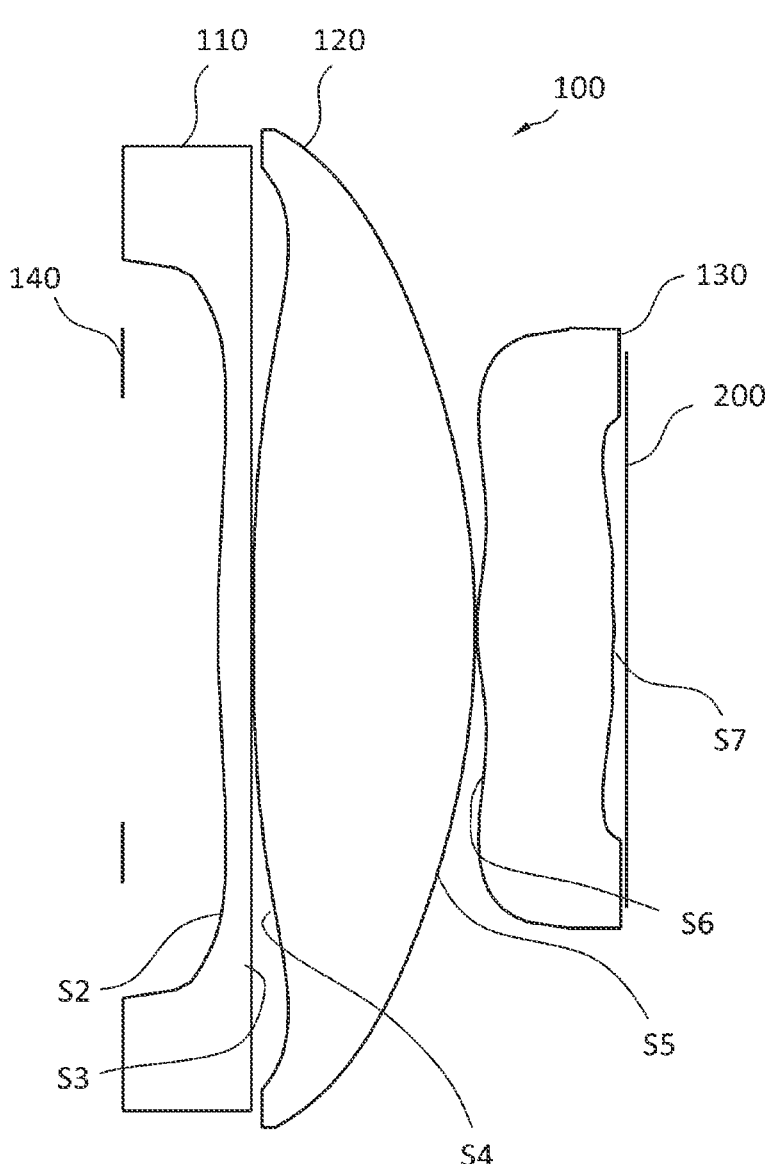
FIG. 9 is a diagram schematically illustrating a lens manufactured by a design method according to an embodiment of the disclosure.

FIG. 9 is a diagram schematically illustrating a lens 100 manufactured by a design method according to an embodiment of the disclosure. The definition of an aspherical surface used in the lens 100 may be represented as follows. When the z-axis direction is set as the optical-axis direction, the aspherical shape may be represented by the following equation by using a Forbes Q-con polynomial in a cylindrical polar coordinate system with respect to the optical-axis direction.

$$z(\rho) = a_0 + \frac{\delta\rho^2}{1 + \sqrt{1 - (1+k)\delta^2\rho^2}} + \left(\frac{\rho}{\rho_{max}}\right)^4 + \sum_{i=0}^{13} g_{2i+4} Q_i^{con}\left(\frac{\rho}{\rho_{max}}\right)^2$$ ⟨Aspherical Equation⟩

Here, "$a_0$" denotes a vertex position along the optical axis (measured from the display surface), "k" denotes a conic constant, $\delta=1/Y$, "Y" denotes the radius of an apex, and "$g_{2\ i+4}$" denotes a coefficient of a Forbes Q-con polynomial Qi con (Forbes, Shape specification for axially symmetric optical surfaces, Optics Express, Vol. 15, Issue 8, pp. 5218-5226 (2007)).

Particular values of fitting parameters for the lens 100 in FIG. 9 are given in Tables 1 and 2 below. In the numerical example, lens surface numbers 2, 3, 4, 5, 6, and 7 are sequentially listed from the side of an object where the user is located to the side of the display surface 201 of the electronic display 200 on which an image is formed, and lens surface symbols S2, S3, S4, S5, S6, and S7 are illustrated. In Table 1, symbols S4-2, S3-2, S4-3, and S5-2 represent the time when a reflected ray is again incident and then refracted or reflected. Also, "Y" denotes a curvature radius, "T" denotes a lens thickness or an air gap between lenses, and all lengths are in units of mm.

TABLE 1

| Surface | Surface Type | Y | T | Index | Abbe number | Refract Mode |
|---------|--------------|------|------|-------|--------|---------|
| Object | Sphere | Infinity | −1000.000 | | | Refract |
| Stop | Sphere | Infinity | 13.000 | | | Refract |
| S2 | Qcon Asphere | 86.003 | 1.482 | 1.650 | 21.825 | Reflect |
| S3 | Sphere | Infinity | 0.100 | | | Refract |
| S4 | Qcon Asphere | 303.400 | 9.882 | 1.545 | 56.000 | Reflect |
| S5 | Qcon Asphere | −73.034 | −9.882 | 1.545 | 56.000 | Reflect |
| S4-2 | Qcon Asphere | 303.400 | −0.100 | | | Refract |
| S3-2 | Sphere | Infinity | 0.100 | | | Reflect |
| S4-3 | Qcon Asphere | 303.400 | 9.882 | 1.545 | 56.000 | Refract |
| S5-2 | Qcon Asphere | −73.034 | 0.100 | | | Reflect |
| S6 | Qcon Asphere | 18.325 | 6.100 | 1.671 | 19.200 | Refract |
| S7 | Qcon Asphere | −13.146 | 0.488 | | | Reflect |
| Image | Sphere | Infinity | 0.012 | | | |

TABLE 2

| Parameter | S2 | S4 | S5 | S6 | S7 |
|-----------|------|------|------|------|------|
| Y Radius | 86.00273 | 303.39952 | −73.03353 | 18.32469 | −13.14568 |
| Normalization Radius | 20.88971 | 27.32217 | 29.39824 | 18.19726 | 12.97647 |
| 4th Order Qcon Coefficient | −3.38744 | 0.63833 | −1.01596 | −14.62959 | 10.75154 |
| 6th Order Qcon Coefficient | 0.09960 | −0.94522 | −0.22157 | 2.70179 | −0.81087 |
| 8th Order Qcon Coefficient | −0.17113 | −0.04808 | −0.21500 | −1.20896 | 1.23727 |
| 10th Order Qcon Coefficient | 0.05539 | −0.00715 | 0.02453 | 0.27459 | −0.24098 |
| 12th Order Qcon Coefficient | −0.00443 | −0.00594 | −0.02741 | −0.15955 | 0.41408 |
| 14th Order Qcon Coefficient | 0.01510 | −0.00356 | −0.00110 | 0.00958 | −0.09426 |
| 16th Order Qcon Coefficient | −0.00604 | 0.00165 | −0.00432 | −0.03491 | 0.16640 |
| 18th Order Qcon Coefficient | −0.00024 | 0.00163 | 0.00430 | −0.00154 | −0.07222 |
| 20th Order Qcon Coefficient | −0.00009 | 0.00038 | −0.00137 | 0.00049 | 0.04193 |
| 22th Order Qcon Coefficient | 0.00033 | −0.00026 | −0.00025 | −0.00229 | −0.02417 |
| 24th Order Qcon Coefficient | −0.00025 | −0.00014 | 0.00000 | 0.00000 | −0.00500 |
| 26th Order Qcon Coefficient | 0.00004 | 0.00000 | 0.00007 | −0.00002 | −0.01182 |
| 28th Order Qcon Coefficient | −0.00008 | 0.00000 | 0.00004 | −0.00141 | −0.00189 |
| 30th Order Qcon Coefficient | −0.00008 | 0.00000 | −0.00004 | 0.00063 | −0.00522 |

Figure 12:
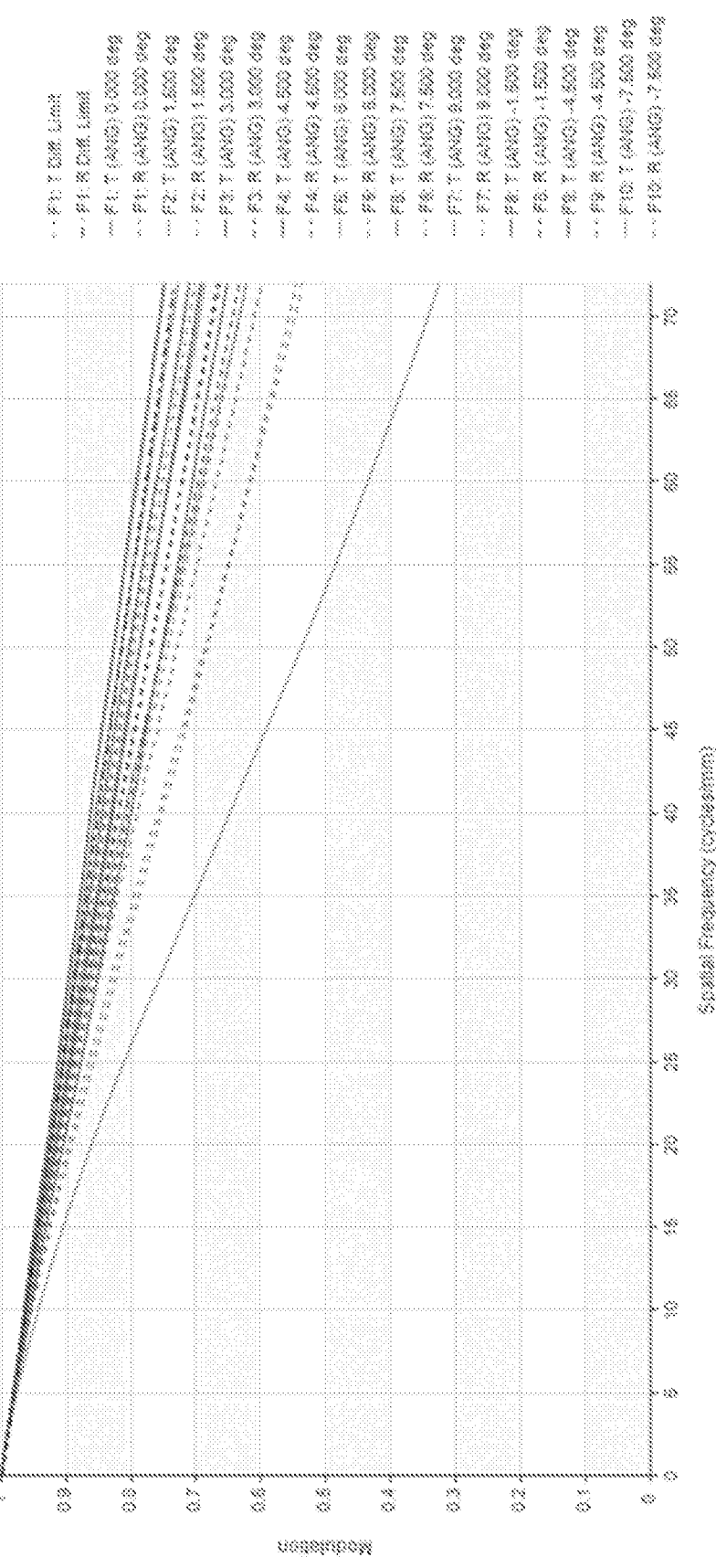
FIG. 12 is a graph illustrating the optical performance of the lens of FIG. 9 in a gaze direction of 20°, a sub-field of ±9°, and a viewing angle of about 11° to about 29°.
Figure 13:
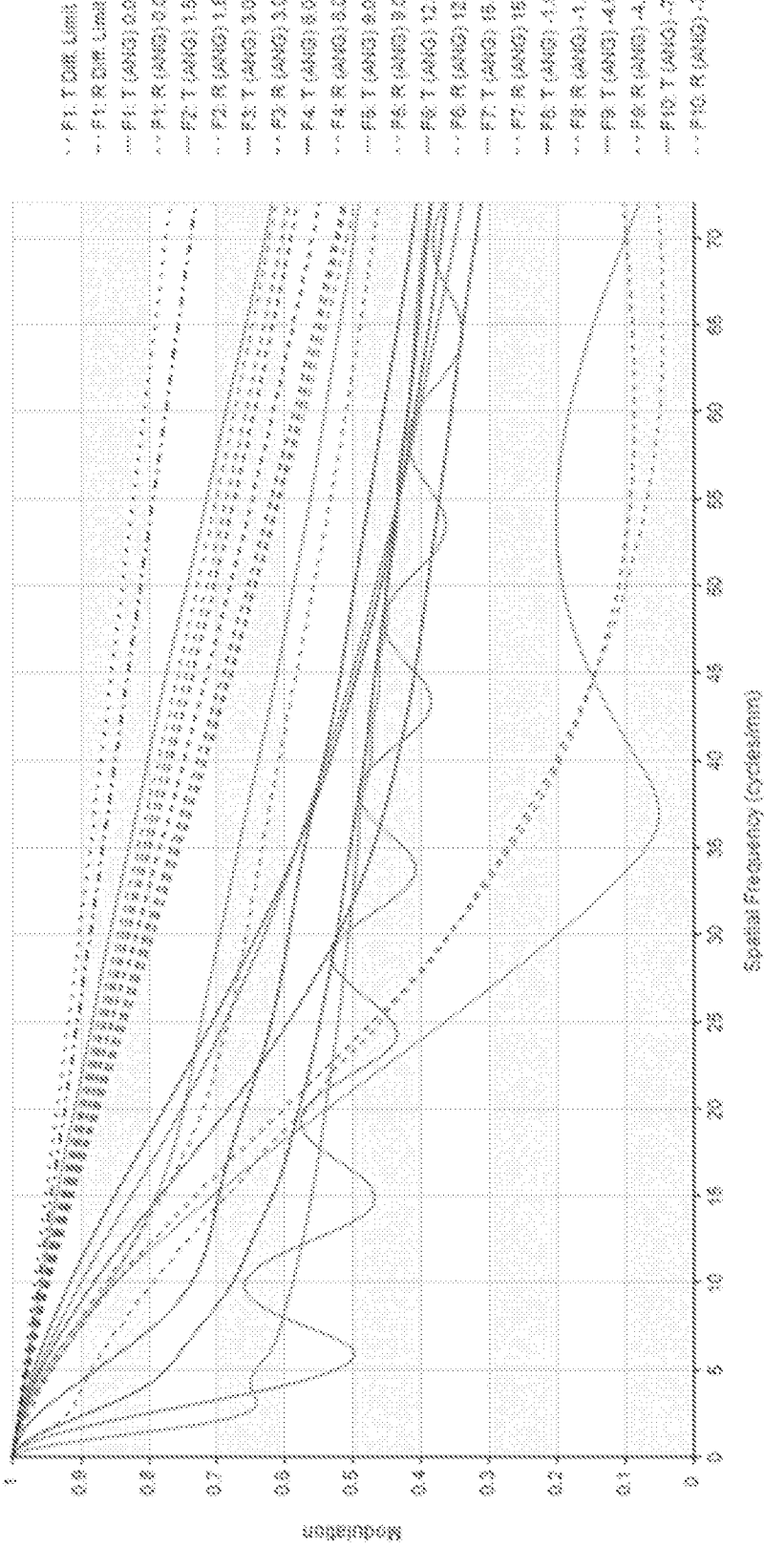
FIG. 13 is a graph illustrating the optical performance of the lens of FIG. 9 in a gaze direction of 30°, a sub-field of ±9°, and a viewing angle of about 21° to about 45°.
Figure 14:
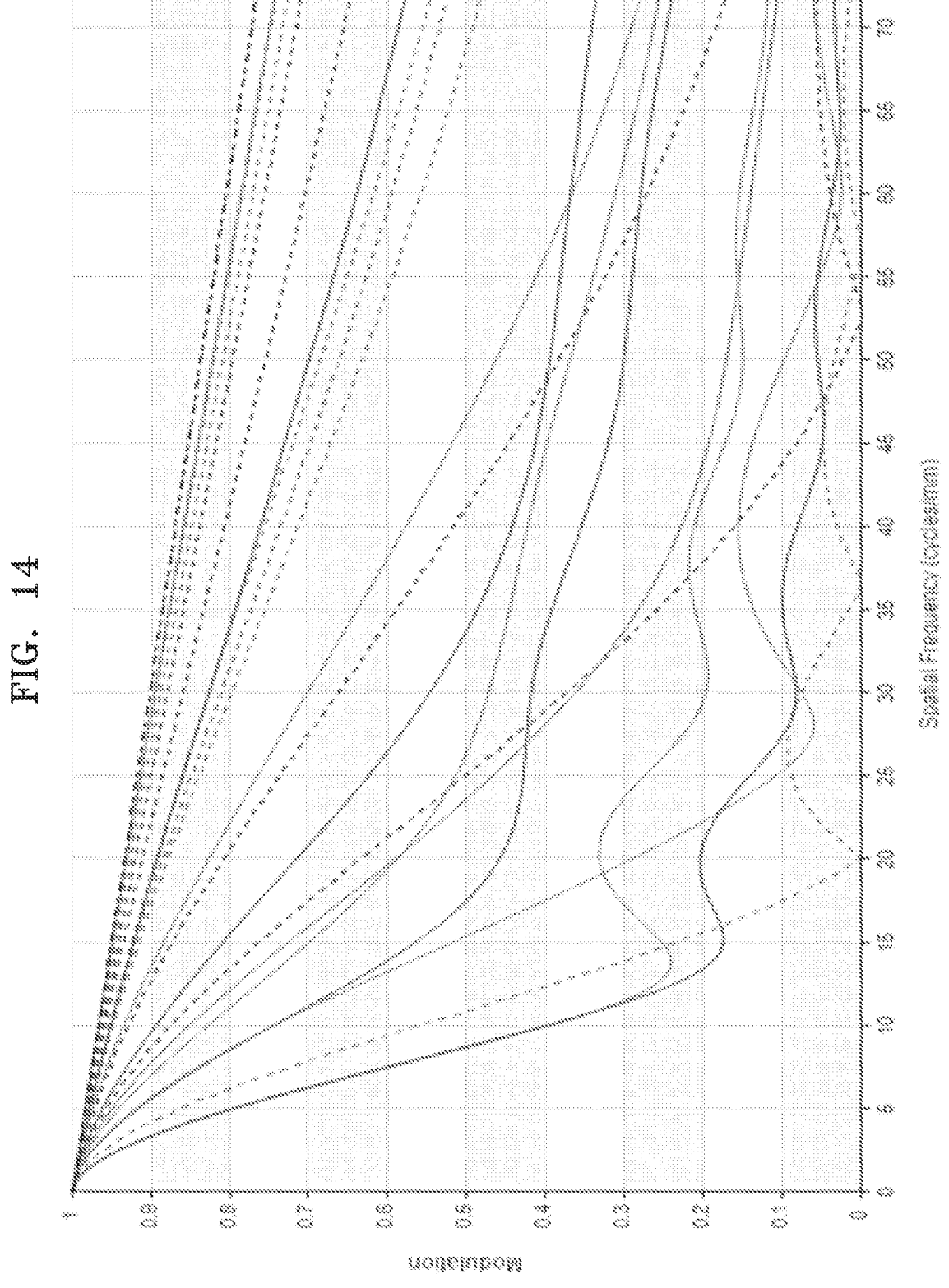
FIG. 14 is a graph illustrating the optical performance for an entire viewing angle when the lens of FIG. 9 is viewed at the front.

FIGS. 10 to 13 are graphs illustrating the optical performances of the lens 100 of FIG. 9 in gaze directions of 0°, 10°, 20°, and 30° respectively, and FIG. 14 is a graph illustrating the optical performance for an entire viewing angle when the lens 100 of FIG. 9 is viewed at the front. In FIGS. 10 to 14, the horizontal axis represents a spatial frequency and the vertical axis represents a modulation size, and different curves are illustrated for the respective viewing angles.

Figure 10:
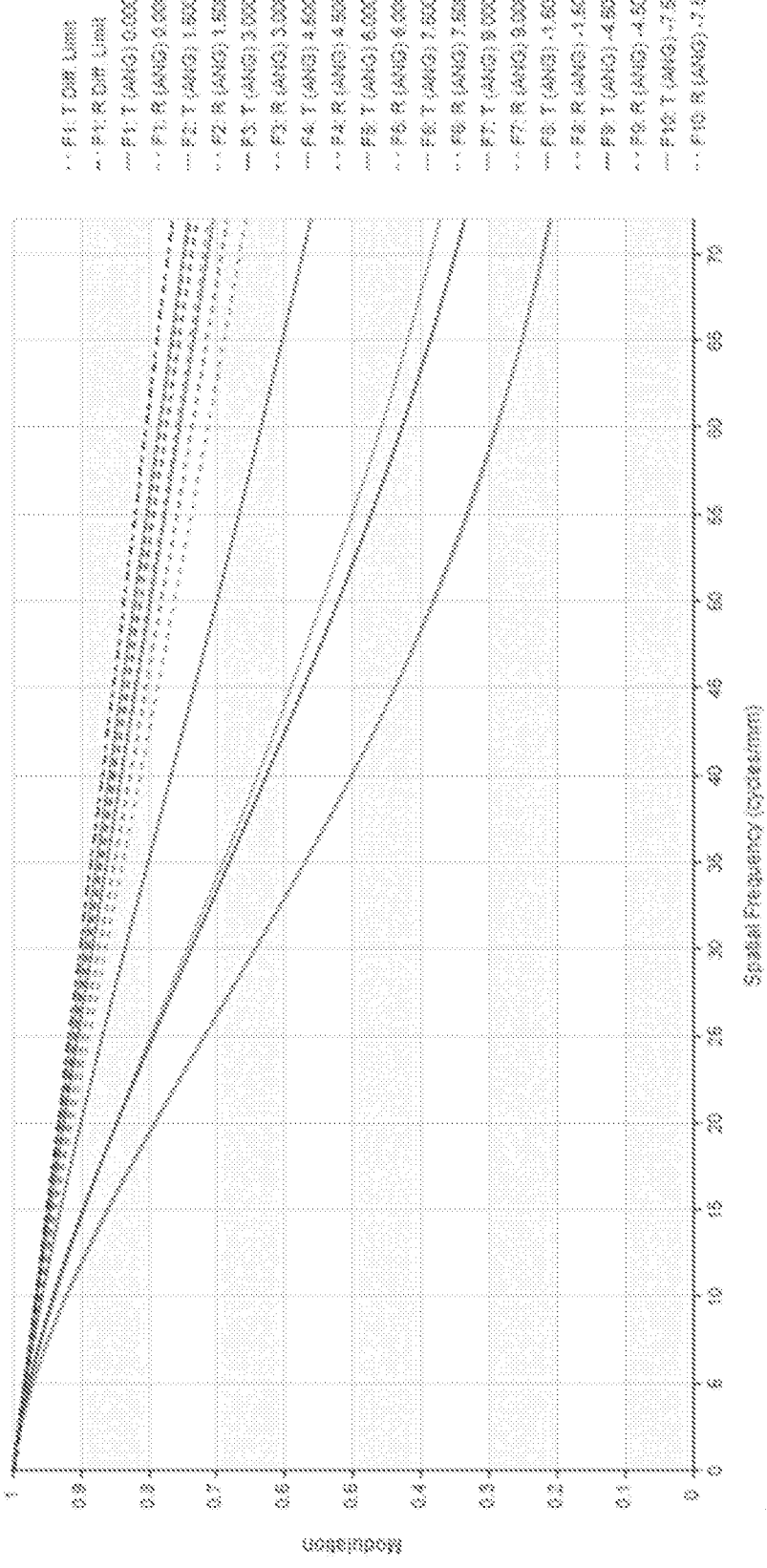
FIG. 10 is a graph illustrating the optical performance of the lens of FIG. 9 in a gaze direction of 0°, a sub-field of ±9°, and a viewing angle of ±9°.
Figure 11:
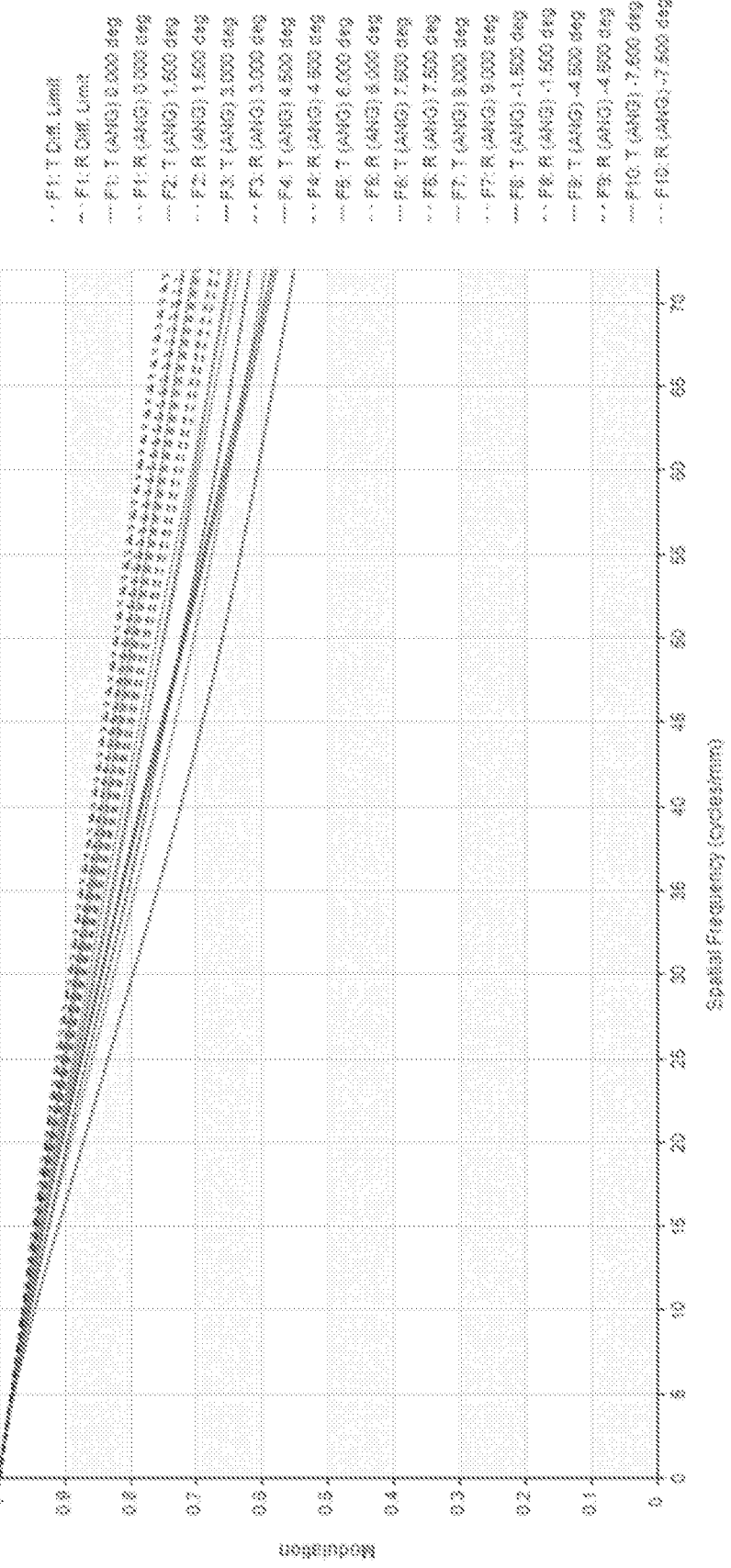
FIG. 11 is a graph illustrating the optical performance of the lens of FIG. 9 in a gaze direction of 10°, a sub-field of ±9°, and a viewing angle of about 1° to about 19°.

Referring to FIG. 10, it may be seen that the resolution is good and uniform in a gaze direction of 0°, a sub-field of ±9°, and a viewing angle of ±9° of the lens 100. Likewise, FIG. 11 illustrates that the resolution is good and uniform in a gaze direction of 10°, a sub-field of ±9°, and a viewing angle of about 1° to about 19° of the lens 100, and FIG. 12 illustrates that the resolution is good and uniform in a gaze direction of 20°, a sub-field of ±9°, and a viewing angle of about 11° to about 29° of the lens 100, and FIG. 13 illustrates that the resolution is relatively good and uniform in a gaze direction of 30°, a sub-field of ±9°, and a viewing angle of about 21° to about 45° of the lens 100.

Moreover, referring to FIG. 14, it may be seen that the lens 100 provides the entire viewing angle when the user gazes at the front.

The lens, the video see-through apparatus employing the lens, and the method of designing the lens have been described above with reference to the embodiments illustrated in the drawings in order to facilitate an understanding thereof; however, this is merely an example, and those of ordinary skill in the art will understood that various modifications and other equivalent embodiments may be made therefrom. Thus, the true technical scope of the disclosed embodiments should be defined by the appended claims.

The invention claimed is:

1. A lens comprising:

at least one lens element configured to interface with a user's pupil along an optical-axis direction from a side of the user's pupil to a side of a display surface, wherein the at least one lens element includes an aperture stop that is configured to be at least a portion of an area for facing the user's pupil, wherein the aperture stop includes a plurality of sub-stop areas corresponding to a plurality of gaze directions within an entire viewing angle of the user with respect to the optical-axis direction, wherein each of the plurality of sub-stop areas corresponds to a first gaze direction of 0°, a second gaze direction of 10°, and a third gaze direction of 20°, respectively, by eye rotation, and wherein an orientation of the plurality of sub-stop areas are based on a human visual system.

2. The lens of claim 1, wherein a radial width of each sub-stop area with respect to the optical-axis direction is based on a human pupil size.

3. The lens of claim 1, wherein each of the plurality of sub-stop areas is rotationally symmetrical about an optical axis in the optical-axis direction.

4. The lens of claim 1, wherein the plurality of sub-stop areas comprise a first sub-stop area and a second sub-stop area that partially overlap each other in a direction perpendicular to the optical-axis direction.

5. The lens of claim 1, wherein each of the plurality of sub-stop areas includes a sub-field range which is determined based on a change in visual acuity according to a human corneal eccentricity.

6. The lens of claim 5, wherein the sub-field range is allocated within an angular range of ±9° corresponding to a macular range in each of the plurality of gaze directions.

7. The lens of claim 5, wherein the sub-field range is nine degrees.

8. The lens of claim 1, wherein a central sub-stop area of the plurality of sub-stop areas corresponds to a front gaze direction to provide the entire viewing angle.

9. The lens of claim 1, wherein a size of an entire stop area of the stop surface is based on a total rotation angle ($\alpha$) of a human eye.

10. The lens of claim 1,
wherein the at least one lens element comprises a first lens element, a second lens element, and a third lens element, and
wherein the first lens element, the second lens element, and the third lens element are oriented sequentially along the optical-axis direction.

11. The lens of claim 10, wherein at least one surface of each of the first lens element, the second lens element, and the third lens element comprises a polarization-selective reflection layer.

12. The lens according to claim 1, wherein an aspherical shape of the lens is optimized to have modulation values that exceed a predetermined optical performance value in a preset range of spatial frequencies in a central area of the lens according to each of the plurality of gaze directions of each of the plurality of sub-stop areas.

13. A head-mounted display (HMD) apparatus comprising:
an electronic display configured to display an image; and
a lens comprising at least one lens element configured to interface with a user's pupil along an optical-axis direction from a side of the user's pupil to a side of a display surface,
wherein the at least one lens element includes an aperture stop that is configured to be at least a portion of an area for facing the user's pupil, wherein the aperture stop includes a plurality of sub-stop areas corresponding to a plurality of gaze directions with respect to the optical-axis direction,
wherein each of the plurality of sub-stop areas corresponds to a first gaze direction of 0°, a second gaze direction of 10°, and a third gaze direction of 20°, respectively, by eye rotation.

14. A method of making a lens including at least one lens element configured to interface with a user's pupil along an optical-axis direction from a side of the user's pupil to a side of a display surface, the method comprising:
setting at least a portion of an area of the lens facing the user's pupil as an aperture stop;
dividing the aperture stop into a plurality of sub-stop areas corresponding to a plurality of gaze directions within an entire viewing angle of the user with respect to the optical-axis direction;
allocating a plurality of sub-field ranges to the plurality of sub-stop areas, respectively; and
optimizing each sub-stop area based on a corresponding gaze direction,
wherein each of the plurality of sub-stop areas corresponds to a first gaze direction of 0°, a second gaze direction of 10°, and a third gaze direction of 20°, respectively, by eye rotation.

15. The method of claim 14, wherein a radial width of each of the plurality of sub-stop areas with respect to the optical-axis direction is based on a human pupil size.

16. The method of claim 14, wherein each of the plurality of sub-stop areas is rotationally symmetrical about an optical axis in the optical-axis direction.

17. The method of claim 14, wherein the plurality of sub-stop areas comprise a first sub-stop area and a second sub-stop area that partially overlap each other in a direction perpendicular to the optical-axis direction.

18. The method of claim 14, wherein each of the plurality of sub-stop areas includes the sub-field range which is determined based on a change in visual acuity according to a human corneal eccentricity.

19. The method of claim 18, wherein the sub-field range is allocated within an angular range ±9° corresponding to a human macula range in each of the plurality of gaze directions.

20. The method of claim 14,
wherein the at least one lens element comprises a first lens element, a second lens element, and a third lens element, and
wherein the first lens element, the second lens element, and the third lens element are oriented sequentially along the optical-axis direction.

21. The method of claim 20, wherein at least one surface of each of the first lens element, the second lens element, and the third lens element includes a polarization-selective reflection layer.

* * * * *